United States Patent [19]

Grammatopoulos

[11] 4,092,975

[45] June 6, 1978

[54] PLURAL CHAMBER SHEET METAL GAS BURNER AND METHOD OF MANUFACTURE

[75] Inventor: Nick G. Grammatopoulos, Bloomingdale, Ill.

[73] Assignee: Groman Corporation, Chicago, Ill.

[21] Appl. No.: 730,133

[22] Filed: Oct. 6, 1976

[51] Int. Cl.² ............................................. A47J 37/07
[52] U.S. Cl. .......................... 126/41 R; 113/116 EE;
431/278
[58] Field of Search ................ 126/41, 25; 29/157 R, 29/157 L, 463; 431/354, 356, 278; 113/116 DD, 116 EE; 239/444

[56] References Cited

U.S. PATENT DOCUMENTS

| | | | |
|---|---|---|---|
| 3,295,509 | 1/1967 | Harvey | 126/25 R |
| 3,638,635 | 2/1972 | Drennan | 126/41 R |
| 3,799,452 | 3/1974 | Hein | 431/354 X |

FOREIGN PATENT DOCUMENTS 2,420,314  6/1975  Germany ...................... 113/116 EE

*Primary Examiner*—Edward G. Favors
*Attorney, Agent, or Firm*—Charles F. Pigott, Jr.

[57] ABSTRACT

The following specification describes a plural chamber gas cooking grill burner formed of two sheet metal shells with external reinforcing rods extending between the chambers and removably supporting the burner in a grill.

3 Claims, 6 Drawing Figures

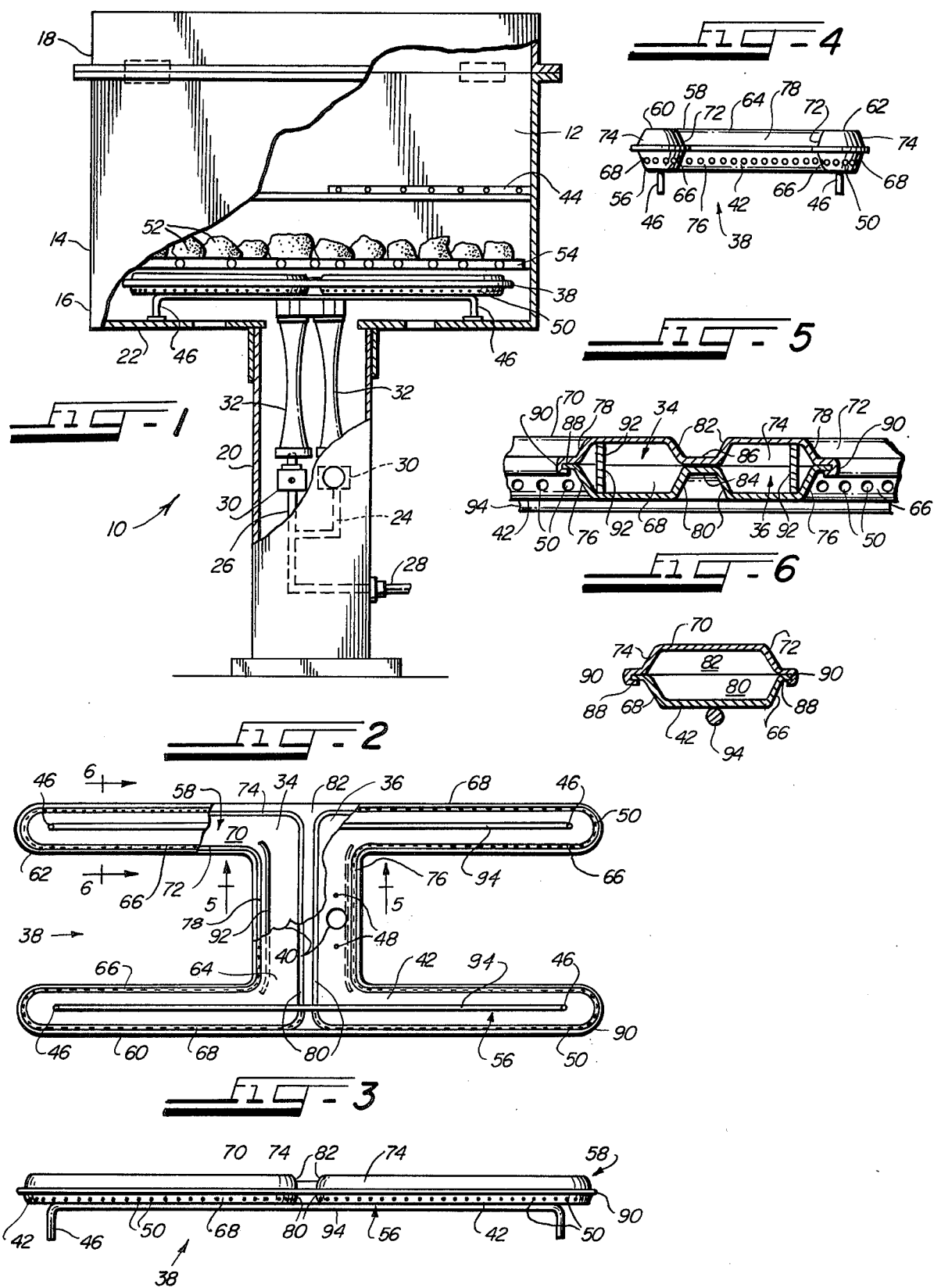

PLURAL CHAMBER SHEET METAL GAS BURNER AND METHOD OF MANUFACTURE

FIELD OF THE INVENTION

This invention relates in general to a gas burner for use in a gas fired grill and more particularly to an improved and more economical cooking grill gas burner, and/or method of fabricating the burner.

SUMMARY OF THE PRIOR ART

In conventional gas fired grills of the type, for example, disclosed in U.S. Pat. No. 3,638,635 a cast gas burner is divided into several sections by an intermediate internal partition wall for forming two independently operable combustion chambers. This facilitates temperature control of the different portions of the grill or cooking space for enabling food or meat located above a series of ceramic briquets spaced intermediate the burner and food to be cooked to a desired condition.

The cast burner while providing satisfactory operation, is difficult to fabricate since the burner is formed from several arms projecting from an intermediate arm or section and all of the arm ends must be closed and the chambers sealed from each other thereby presenting a problem in the removal of the core.

SUMMARY OF THE INVENTION

The present invention provides a plural chamber gas burner for a cooking grill formed of two stamped shells secured to each other along their outer periphery or margin with the chambers separated by a planar rib or wall on each shell engaged with a planar rib or wall on the other shell and welded thereto to form an effective seal.

An elongate rod having bent ends is secured to the one shell. The rod bridges the planar walls and serves to both rigidify the shells and removably support the gas burner on the bent ends at a position above the bottom wall of the grill housing.

BRIEF DESCRIPTION OF THE DRAWINGS

FIG. 1 is a front elevational view of a cooking grill having a gas burner incorporating the principles of the present invention with the grill partially broken away to expose the interior.

FIG. 2 is a bottom elevational view partially broken away of a gas burner shown in FIG. 1, and incorporating the principles of the present invention.

FIG. 3 is a side elevational view of the gas burner shown in FIG. 2.

FIG. 4 is an end elevational view of the gas burner shown in FIGS. 2 and 3.

FIG. 5 is a sectional view taken generally along the line 5—5 in FIG. 2; and

FIG. 6 is a sectional view taken generally along the line 6—6 in FIG. 2.

DESCRIPTION OF THE PREFERRED EMBODIMENT

In FIG. 1 a gas fired cooking grill is indicated generally by the reference character 10. The grill 10 includes a cooking chamber or enclosure 12 defined by a housing 14 formed by a bottom section 16 and a top section 18. The top section 18 is hingedly supported on one vertically extending wall of the bottom section 16 for pivotal movement to open or close the chamber 12.

The housing 14 is carried on a hollow column 20 extending between a bottom wall 22 of housing section 16 and a suitable support. A pair of conventional cooking gas conduits 24 and 26 are located in column 20 and the conduits 24 and 26 branch from a common feed conduit 28 for communicating cooking gas through a respective manually controlled adjustable valve 30 to a respective venturi delivery tube 32. Each venturi tube 32 in turn communicates cooking gas and combustion air to a respective combustion chamber 34 and 36 of a gas burner 38 through a respective aperture 40 in the bottom wall 42 of the burner 38, as seen for chamber 36 in FIG. 2 for heating or cooking food located above the burner 38 on a removable rack 44 in the chamber 12.

The burner 38 is removably supported on the bottom wall 22 of the housing 14 by means of spaced vertical standards 46 and the chambers 34 and 36 each aligned with a respective venturi tube 32 by means of respective projections on the tubes received in apertures 48 for each chamber spaced on opposite sides of a respective aperture 40 in the burner bottom wall 42. The burner flame is developed or created at a series of apertures or orifices 50 spaced along the periphery of the burner 38. A layer of ceramic briquets 52 are located on a removable grate 54 spaced intermediate the burner 38 and the food on rack 44 with passages between and around the briquets 52 admitting or passing the combustion products from the orifices 50 of burner 38 upwardly for heating or cooking food. Juices from the heated or cooked food may of course drip upon the briquets 52 for vaporization or burning to provide the characteristic flavors of food cooked upon such a grill 10.

The combustion chambers 34 and 36 of burner 38 are each U-shaped in a horizontal plane and assembled from an integrally formed stamped lower shell 56 and an integrally formed stamped upper shell 58. Each shell 56 and 58 may be formed of suitable heat resistant metal and has a generally H-shaped configuration defining spaced parallel side arms 60 and 62 and an interconnecting intermediate or central arm 64 for each shell. The arms 60 and 62 are project in opposite directions from the central arm 64 to define side legs of each U-shaped chamber 34 and 36 and the arm 64 defines a back leg for each U-shaped combustion chamber 34 and 36, as best seen in FIGS. 2-6.

The arms 60 and 62 of each shell 56 and 58 are generally U-shaped in cross section, as best seen in FIG. 6 with a relatively wide back wall on the lower section 56 forming the bottom wall 42 of the burner 38. Vertically upwardly extending inner and outer side legs 66 and 68 respectively of the lower shell 56 are perforated at spaced positions to form apertures 50 located intermediate wall 42 and the upper edge of the side legs 66 and 68. The upper shell 58 has a back wall 70 of similar dimension to wall 42 and vertically downwardly extending inner and outer side legs 72 and 74 respectively of the upper shell 58 extend toward the side legs 66 and 68 respectively of the lower shell 56 to space the back wall 70 from wall 42.

The vertically extending side legs 66 and 68 of the bottom shell 56 are joined or merge at the outer ends of each arm 62 and 64 as do the vertically extending side legs 72 and 74 of of the top shell 58 to form the outer ends of the arms 60 and 62 for each chamber 34 and 36. The merged ends of legs 66 and 68 are also provided with apertures 50.

The lower shell inner legs 66 of arms 60 and 62 are joined by a respective transverse vertically extending leg 76 for each chamber 34 and 36 with legs 76 formed along each outer margin of the central arm 64 and each leg 76 is also provided with apertures 50. Likewise the inner leg 72 of each arm 60 and 62 of the upper shell 58 is joined by a respective transverse vertically extending leg 78 formed along the outer margin of the central arm 64. The legs 76 and 78 extend toward each other to form one margin for the back leg of each combustion chamber 34 and 36, as best seen in FIG. 5.

The other margin for each chamber back leg is formed by one of a pair of vertically upwardly extending spaced apart legs 80 on the bottom shell 56 and one of a pair of respective vertically downwardly extending spaced apart legs 82 on the top shell 58. The legs 80 are joined by a planar rib 84 on the bottom shell 56 and the legs 82 on the top shell are joined by a planar rib 86 engaged with rib 84 to separate the chambers 32 and 34 with each shell defining a pair of parallel U-shaped channels communicating with arms 60 and 62. Thus the outer side legs 68 and 74 of the bottom and top shells 56 and 58 terminate at positions spaced apart by the ribs 84 and 86 respectively and the separate channels of U-shaped cross section for each shell are formed at the central arm 64 for separating the chambers 34 and 36. The ribs 84 and 86 are preferably welded together.

A peripheral lip 88 is formed at the free or upper edge of side legs 66, 68 and 76 of the lower shell 56. The lip 88 extends outwardly of the respective side legs and transverse thereto for engagement between the fingers of a peripheral lip 90 formed about the periphery of legs 72, 74, and 78 and the ends of rib 86 of the upper shell 56 for enveloping the ends of rib 84. The fingers of the lip 90 thus overlap or nestingly receive the lip 88 of the lower shell 56 and the ends of rib 84 to seal the mating edges of the two shells 56 and 58 and thereby provide a substantially gas tight seal between the margins of the two shells and between the coplanar chambers 34 and 36.

Separate spaced stamped diverter walls 92 are also positioned between the shells 56 and 58 in the central arm adjacent the legs 76 and 78 of each chamber for ensuring proper flame distribution. The walls 92 are also welded to the adjacent walls 72 and 70 of the shells 56 and 58.

In addition a pair of elongate rods 94 are secured to the bottom surface of wall 42 by welding and each extends along the central longitudinal axis of a respective arm 60 and 62. Each rod 94 bridges the gap between legs 80 and 82 to aid in rigidifying the burner and the rod ends are bent into the vertical extending standards 46 on which the burner is removably supported on the bottom wall 22 of the chamber 12.

Although the manner in which the improved burner 38 is formed should be obvious from the foregoing it will be noted that the shells 56 and 58 and walls 92 are simply stamped from commercially available sheet stock and the diverter walls assembled intermediate the two shells, whereafter the lip 90 is folded over the lip 88 and the shells, rods and diverter walls conventionally welded. Assembly is of course simplified since the shells are symetric about a vertical axis extending through the intermediate arm so that rotation of 180° in the shell position still maintains the parallel and intermediate arms of the shells aligned.

Operation of the gas burner 38 proceeds by opening one or both valves 30 to admit cooking gas and combustion through a respective passage 40 in wall 42 of shell 56 and to a respective chamber 34 or 36. Thus the gas flows from passage 40 through a respective box-like channel in the arm 64 formed by the U-shaped channels of each shell in communication with arms 60 and 62 of the respective chamber 34 and 36. Communication between the chambers is prevented by the intermediate walls or legs 80, 82 or the partition wall or ribs 84 and 86. Thus gas exits only from the apertures 50 of a selected chamber or the apertures of both chambers if both valves are open and on lighting this gas, chamber 12 is heated correspondingly.

The size of the flame which emanates from the apertures 50 is of course controlled by the degree to which the respective valve 30 is opened and therefore the heating of the chamber is also correspondingly controlled in this manner. The lips 88 and 90 serve to arch the flame upwardly therearound for creating more even flame distribution. It will be appreciated that either one or both of chambers 34 and 36 may be selectively used for controlling the heat in chamber 12 and that the location of the ribs 84 and 86 as well as legs 80 and 82 separating the chambers may be selected as desired to provide combustion chambers of desired size and position.

The foregoing constitutes a description of an improved gas burner and/or method for fabricating the same. However, the inventive concepts thereof are not believed limited to the described embodiment, but are believed set forth in the accompanying claims.

What is claimed is:

1. A gas burner for use in a gas fired cooking grill of the type adapted to carry a horizontally disposed rack for supporting food and having gas supply inlets, the improvement comprising, in combination, a pair of generally H-shaped stamped sheet metal shells generally U-shaped in cross-section, one comprising a top shell and the other comprising a bottom shell, said top and bottom shells being secured together by a peripheral lip on one of said shells being bent over a peripheral edge on the other of said shells so as to form a permanent seal around substantially the entire periphery of said H-shaped shells and thereby form a gas chamber therein, said top and bottom shells each being formed with a depressed planar portion which extends transversely across the width of the shell approximately midway between the ends thereof so as to divide each top and bottom shell into a pair of generally U-shaped shell sections, said transverse planar portions being arranged to abut one another when said top and bottom shells are interconnected so as to form a gas-tight seal thereby defining two separate generally U-shaped hollow burner chambers for connection to separate gas inlets, a plurality of gas outlet apertures formed in a wall of said bottom shell around substantially the entirety of its H-shaped configuration for directing a gas flame upwardly over said peripheral lip on said top shell, and a pair of gas inlet apertures formed in said bottom shell on opposite sides of said transverse planar portions for connection to respective gas inlets.

2. A gas burner as defined in claim 1 in which said abutting transverse planar portions of said top and bottom shells are welded to one another to improve the gas seal therebetween.

3. A gas burner as defined in claim 1 in which a pair of elongated rods are secured to the bottom of said bottom shell in spaced parallel relation, said rods extending along the major portion of the length of said H-shaped bottom shell on opposite sides thereof so as to rigidify said gas burner, and the ends of said rods being bent downwardly to provide four support legs for said gas burner.

* * * * *